United States Patent [19]
Leutner et al.

[11] 3,835,888
[45] Sept. 17, 1974

[54] ELECTRO HYDRAULIC SERVO CONTROL VALVE

[75] Inventors: Volkmar Leutner, Hemmingen; Roman Romes, Friolzheim, both of Germany

[73] Assignee: Robert Bosch GmbH, Stuttgart, Germany

[22] Filed: Nov. 3, 1972

[21] Appl. No.: 303,634

[30] Foreign Application Priority Data
Dec. 7, 1971  Germany............................ 2160490
Dec. 7, 1971  Germany............................ 2160488
Dec. 7, 1971  Germany............................ 2160489

[52] U.S. Cl... 137/625.61, 137/625.63, 137/625.64, 323/94 H
[51] Int. Cl. .......................................... F15b 13/043
[58] Field of Search ........... 251/131; 137/83, 625.6, 137/625.61, 625.62, 625.63, 625.64; 323/94 H; 73/DIG. 3

[56] References Cited
UNITED STATES PATENTS

| | | | |
|---|---|---|---|
| 2,875,782 | 3/1959 | Lee................................. | 137/625.68 |
| 2,884,907 | 5/1959 | Atchley.......................... | 137/83 UX |
| 2,953,123 | 9/1960 | Reen et al.................. | 137/625.64 X |
| 2,961,002 | 11/1960 | Gordon.......................... | 137/625.62 |
| 3,018,795 | 1/1962 | Gordon.......................... | 137/625.61 |
| 3,162,804 | 12/1964 | Parsons........................... | 323/94 H |
| 3,176,593 | 4/1965 | Bernstein..................... | 137/625.61 X |
| 3,178,151 | 4/1965 | Caldwell......................... | 251/141 X |
| 3,216,454 | 11/1965 | Richter et al.................. | 137/625.69 |
| 3,308,795 | 3/1967 | Amsbury........................... | 123/41.15 |
| 3,543,642 | 12/1970 | Seamone..................... | 137/625.64 X |

FOREIGN PATENTS OR APPLICATIONS

| | | | |
|---|---|---|---|
| 907,226 | 10/1962 | Great Britain................. | 137/625.21 |
| 1,197,897 | 7/1970 | Great Britain.................... | 137/487.5 |

*Primary Examiner*—William R. Cline
*Assistant Examiner*—Gerald A. Michalsky
*Attorney, Agent, or Firm*—Michael S. Striker

[57] ABSTRACT

An electro hydraulic servo valve has a valve slide plate mounted in a housing for angular movement between positions in which inlet and outlet conduits and consumer conduits are connected and disconnected. The permanent magnet of a transmitter turns with the valve slide plate and cooperates with flux responsive elements so that a first signal representing the position of the valve slide plate is generated, and supplied to a first input of a differential amplifier whose second input receives a second signal representing a desired position of the valve slide plate. The differential amplifier forms a differential signal representing the difference between the desired and actual positions which is supplied to the electric input of an electro fluidic transducer whose fluidic output controls a hydraulic setting motor to move the valve slide plate from the actual position to the desired position.

16 Claims, 7 Drawing Figures

ELECTRO HYDRAULIC SERVO CONTROL VALVE

BACKGROUND OF THE INVENTION

The present invention relates to an electro hydraulic servo valve which has a valve slide for controlling the flow of fluid to and from consumer conduits operated by a setting motor which is controlled by an electro fluidic transducer.

The U.S. Pat. No. 3,018,795 discloses an electrohydraulic servo valve of this type in which a baffle plate is secured to a rotary valve slide, and cooperates with a single nozzle of an electro hydraulic transducer. An electro magnetic setting member acts also on the baffle plate in the opposite direction. The mechanical arrangement results in a low sensitivity of the servo valve since there is no amplification. Only a single nozzle can be used, which requires a throttling point and a differential piston for operating the rotary valve slide, which also reduces the sensitivity of the servo valve. This is of particular importance since a turnable valve slide plate is subject to greater friction than piston valve slides which are conventionally used in servo valves. A precise operation of the servo valve may be disturbed by bending of the baffle plate, by radial and axial play of the rotary valve plate, by the thickness of the baffle plate and by friction, and the arrangement is rather complicated and difficult to tune.

The U.S. Pat. No. 2,875,782 discloses a servo valve with a flat valve plate which permits the exactness of the control edges, required for servo valves, to be obtained by a simpler construction as for valve slide pistons. Nevertheless, flat valve plates were not successful due to the high friction since the sensitivity of the servo valve is substantially reduced.

The U.S. Pat. No. 2,950,703 discloses control apparatus for the rudder of an airplane in which a pump supplies pressure fluid to a consumer through an electro hydraulic servo valve. The electric input of the servo valve is connected by an electric amplifier and controlled by automatic or manually operated signal generators, or operation amplifiers. The electric amplifier must be tuned to the servo valve, and constitutes a separate building element between the signal generator and the servo valve. Between amplifier and servo valve, a current feedback occurs, so that the provision of a separating gap, which is required for two separate units, is detrimental.

Other conventional servo valve arrangements include amplifiers or regulators separated from the servo valve, which have a predetermined output current whose magnitude must correspond to the construction of the servo valve. Furthermore, the amplifier must be tuned to the servo valve. Generally speaking, comparative servo valves with great current, between 20 and 200 mA operate with small input resistances, about 1,000 Ohm, while standard operation amplifiers provide control currents of only 5 to 10 mA and therefore are not suitable as direct signal generator for the servo valve, particularly since no tuning of the two devices is carried out.

SUMMARY OF THE INVENTION

It is one object of the invention to overcome the disadvantages of the servo valve arrangements of the prior art.

Another object of the invention is to provide a servo valve including a flat valve slide plate, which reliably and accurately operates.

Another object of the invention is to provide a servo valve which is highly sensitive, and operates with great exactness.

Another object of the invention is to provide a servo valve with a flat valve slide plate whose quality of operation is at least equal to the quality of servo valves using piston valve slides.

With these objects in view, the present invention comprises a position responsive electric transmitter, connected with the valve slide, and generating signals indicating the actual position. Signals representing wrong positions of the valve slide are amplified by an amplifier connected before the fluidic part of an electro fluidic transducer. The valve slide is preferably a flat valve slide plate.

An embodiment of the invention comprises a valve slide, preferably a turnable valve slide plate, mounted in a housing for movement between a plurality of positions for connecting and disconnecting consumer conduits and an inlet and outlet in the housing; a position responsive transmitter connected with the valve slide for movement, and including a generator for generating a first electric signal representing the actual position of the valve slide, the transmitter preferably including an electromagnet rotating with the valve slide, and flux responsive elements; a differential amplifier having a first input receiving the first signal, and a second input for receiving a second electric signal representing a desired position of the valve slide; an electro fluidic transducer having an input connected with the output of the differential amplifier for receiving a differential signal representing the difference between the desired position and the actual position of the valve slide; and a hydraulic setting motor connected with the fluidic output of the fluidic transducer and controlled by fluid therefrom to move the valve slide from the actual position to the desired position.

In this manner, a high reaction sensitivity can be obtained for servo valves with flat valve slide plates, irrespective of the high friction thereof, which exceeds the reaction sensitivity of known servo valves. This favorable result can only be obtained by a great magnification of the differential signal, which can be obtained only by an electric amplifier connected with the electric part of the electro fluidic transducer, and before the fluidic part of the transducer. Even if the position difference is small, the fluidic transducer is fully operated and applies the full pressure difference to the setting motor. In this manner, a twenty times higher reaction sensitivity can be obtained, as compared with the same type of servo valve provided with a mechanical return. This results in a substantially higher exactness of the operation. Furthermore, an amplification can be obtained, which is ten times higher than the amplification of similar servo valves. A particularly simple construction is obtained, if the position responsive transmitter includes an electronic generator, and when the electric amplifier is constructed as an electronic amplifier.

In the preferred embodiment of the invention, the electronic generator for indicating the valve slide position is arranged coaxial with the valve slide. In this manner, disturbances due to friction, play and elasticity of the parts, can be reduced to a minimum since practically no conductors are required. Furthermore, this construction results in a very compact apparatus. Due to the use and arrangement of an electronic transmitter, the same can be arranged in a housing part which is free of pressure fluid.

It is particularly advantageous if the servo valve includes an electronic amplifier which is suited for the direct processing of signals from standard operational amplifiers, representing the desired position of the valve slide. In this manner, an additional element between the servo valve and the operation amplifier is omitted, and the impedance transformation, and the production of a suitable current takes place in the servo valve. Th servo valve can be controlled by signals from conventional operation amplifier, since it operates with control currents of less than 1 mA. It is an advantage that the separating gap between the servo valve and the electronic component is placed in a region, free of feedback effects, in which no difficulties regarding adaptation occur. Furthermore, a power amplification ten times the amplification of a comparable servo valve according to the prior art, can be obtained.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
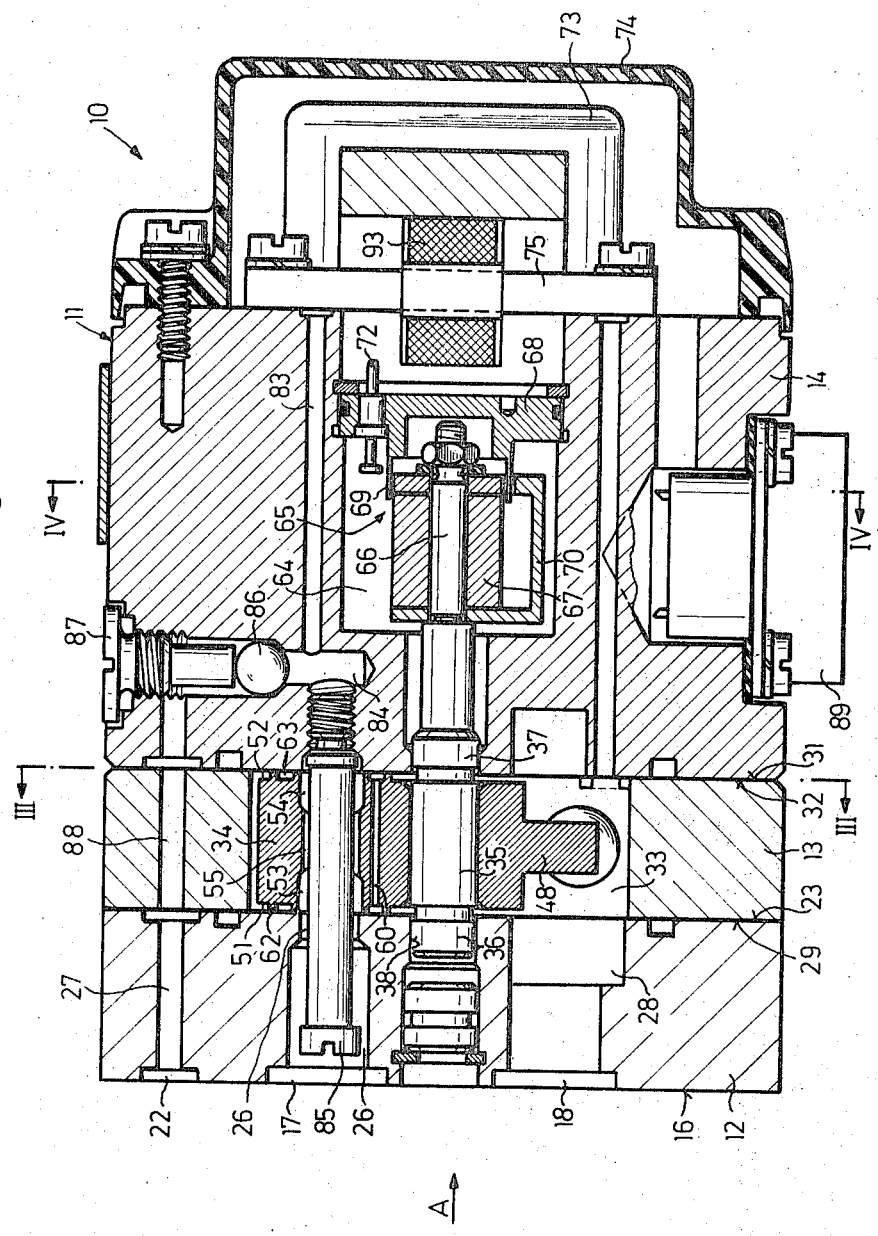
FIG. 1 is a longitudinal sectional view illustrating an electro hydraulic servo control valve according to an embodiment of the invention.
Figure 2:
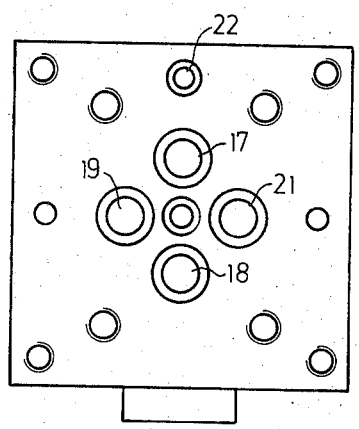
FIG. 2 is an end view at a reduced scale, taken in the direction of the arrow A in FIG. 1.

An electro hydraulic servo control valve, generally indicated by reference numeral 10, has a housing 11 which includes three bodies 12, 13, 14 abutting each other, and held together by screws 15. The end wall 12 has an end face 16 in which an inlet 17, an outlet 18, and two consumer conduits 19 and 21 are provided, together with an oil inlet 22, as best seen in FIGS. 1 and 2. The end wall 12 has on the other side, a planar surface 23, in which openings 24, 25 form ports of the consumer conduits 19, 21. The inlet 17 has a port 26, and the outlet 18 has a port 28 on surface 23. Ports 24, 25, 26, 28 are located on a circle equidistant from the axis of a shaft 35.

Figure 3:
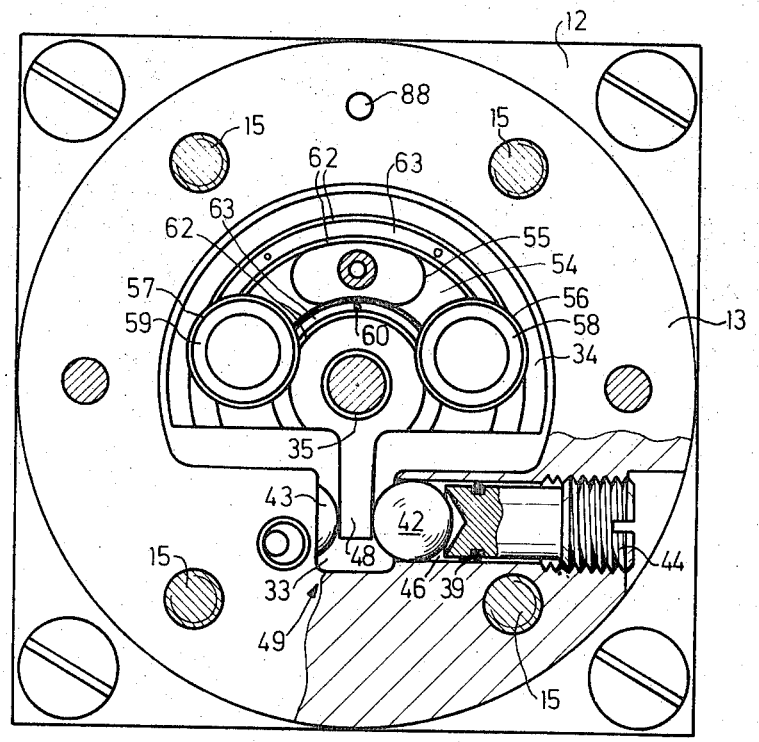
FIG. 3 is a cross sectional view taken on line III—III in FIG. 1.
Figure 5A:
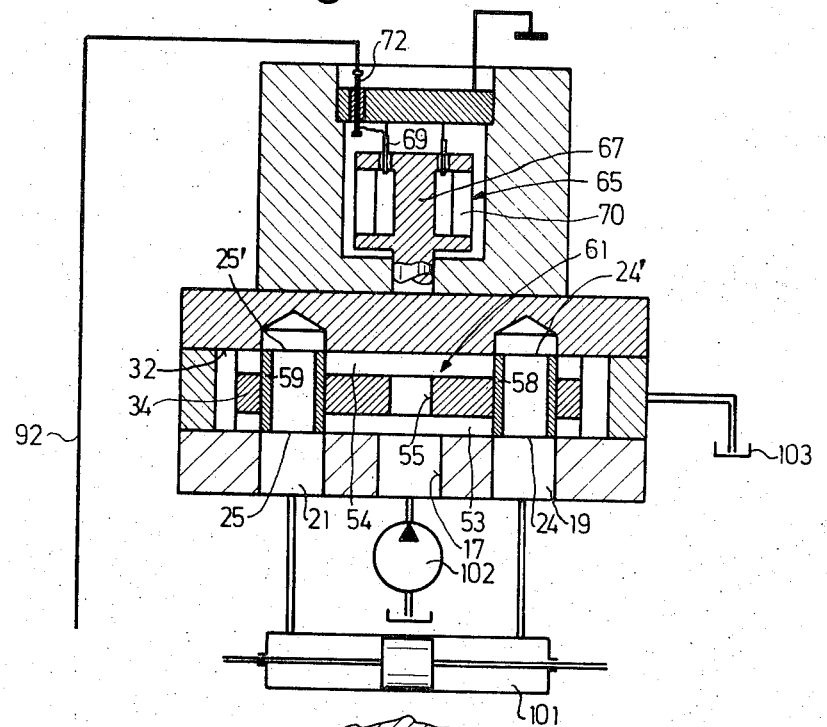
FIG. 5a is a schematic longitudinal sectional view illustrating the embodiment of FIG. 1 in a simplified schematic manner.
Figure 5B:
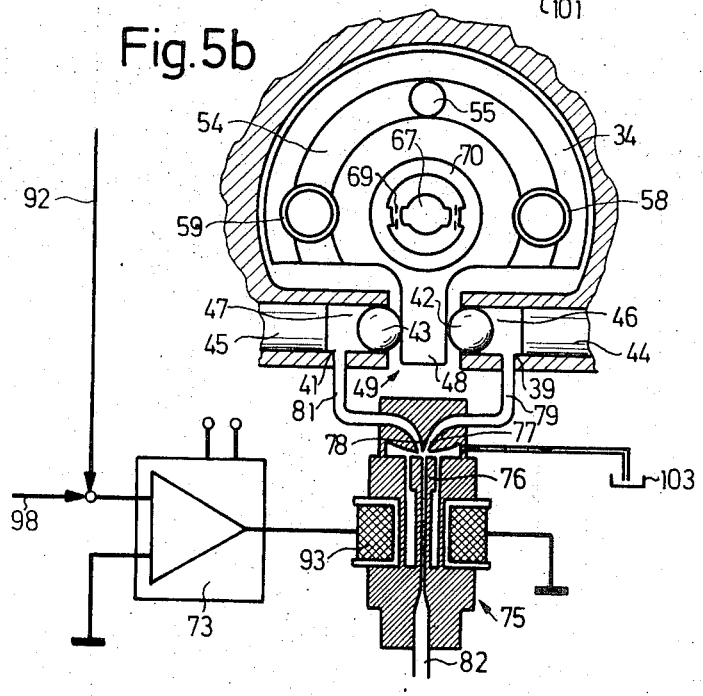
FIG. 5b is partly a fragmentary schematic cross sectional view of the apparatus of FIG. 5a, and partly a diagrammatic view illustrating an amplifier and an electro fluidic transducer.

An intermediate wall 13 has a planar surface 29 which abuts surface 23. The other surface 31 of the intermediate wall 13 abuts the surface 32 of the housing portion 14. Since the intermediate housing body 13 is substantially annular, as best seen in FIG. 3, a valve cavity 33 is formed between the housing body 12 and the housing body 14, into which open the ports 24, 25, 26, 28, and the control port 27. In valve chamber 33, a flat valve slide plate 34, carried by shaft 35, is rotatable with the shaft 35 which has shaft portions 36, 37 projecting from opposite sides of the flat valve slide plate 34, and being rotatably mounted in a bearing bore 38 which penetrates the housing bodies 12 and 14. Perpendicularly to the axis of shaft 35, and laterally displaced, two coaxial cylinders 39, 41, see FIG. 5b, are provided which guide spherical pistons 42, 43, as best seen in FIG. 3. The chambers of the spherical pistons 42, 43 can be adjusted by screws 44. Between the spherical pistons 42, 43 and the setting screws 44, 45, which are accessible from the outside of the housing, pressure spaces 46, 47 are formed in the cylinders 39, 41, respectively. The spherical pistons 42, 43 are located on opposite sides of a radial projection 48 of the valve slide plate 34, and form a hydraulic setting motor for turning the valve slide plate 34 between a plurality of positions for connecting inlet and outlet conduits 17, 18 and consumer conduits 19, 21, shown in FIG. 2.

The valve slide plate 34 has two parallel faces 51, 52 slidingly engaging the surfaces 23 and 32. Along the circle on which the ports 24, 25, 26, 28 are located, the valve slide plate has substantially semi-circular grooves or channels 53, 54 which extend between the end faces of the valve slide plate from which the projection 48 projects. The channels 53, 54 are connected by a recess 55 in the region of the inlet port 26. At the same distance from the recess 55, and spaced from the end faces of the valve slide plate 34, see FIGS. 3 and 5b, are axial bores 56, 57 into which tubular members 58, 59 are inserted, respectively. The outer diameter of the tubular members 58, 59 is exactly the same as the diameter of the respective associated ports 24, 25, and greater than the width of the grooves or channels 53, 54 so that, when the valve slide plate 34 is in a neutral position, a space 61, connected with the inlet 17, and separated from the outlet 18 and from the consumer conduits 19 and 21, is formed, as shown in FIG. 5a.

On both sides of the grooves 53, 54, and along the same, two narrow ridges 62 are provided between the tubular members 58, 59 which seal the space 61 in which the inlet pressure prevails. In this manner, pockets 63 in the slide faces 51, 52 are formed, which are connected by bores 60 in such a manner that the pressures acting on the valve slide plate 34 are balanced, so that jamming of the valve slide plate 34 is prevented, and friction is reduced. For the same purpose, the surface 32 of the housing body 14, has pressure chambers 24', 25', corresponding to the ports 24, 25 in surface 23 of end wall 12.

In order to obtain the exactness required for servo control valves, the housing body 14, the end wall 12, the intermediate body 13, and the valve slide plate 34 are drilled in the same operation, together with the bearing bore 38 in which the shaft 35 is mounted.

Figure 4:
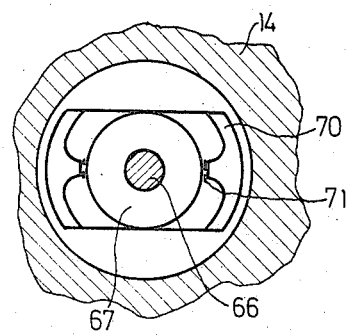
FIG. 4 is a fragmentary sectional view taken on line IV—IV in FIG. 1.

In the housing body 14, the bearing bore 38 opens into a space or cavity 64 which houses an electronic position responsive transmitter 65 which has a permanent magnet mounted on the free end portion 66 of shaft 35 for angular movement therewith, and cooperating with the generator 68 including field responsive elements 69 which project into the circular path of gaps 71 formed between the armature 70 and the permanent magnet 67, as best seen in FIG. 4. The shape of the iron armature 70 prevents the formation of a stray field of the permanent magnet 67 into the housing body 14. During angular movement of the valve slide by the setting motor 44 to 48, the permanent magnet 67 and the armature 70 are together angularly displaced so that the stationary elements 69 pass through the gaps 71, and generate a corresponding signal.

Figure 6:
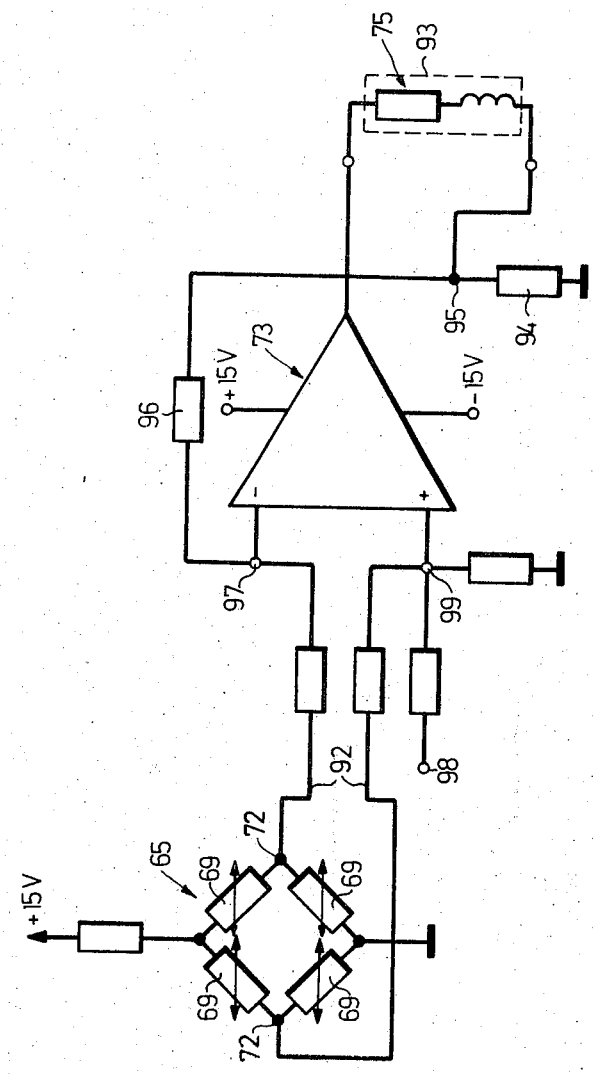
FIG. 6 is a diagram illustrating the electric circuit of the invention.

As shown in FIG. 6 four elements 69 are provided which form a Hall generator, or corresponding generator, and are connected in a bridge circuit. As best seen in FIG. 5a, the output contacts 72 of the flux responsive elements 69 are connected by conductors 92 and resistances to the inputs 97, 99 of an electronic amplifier 73 which is mounted on the end face of housing body 14 under a cap 74, as shown in FIG. 1. An electro fluidic transducer 75 is also mounted under cap 74 on the end face of housing body 14.

As best seen in FIGS. 5b and 6, the output of the electronic amplifier 73 is connected with the winding 93 of the electro fluidic transducer 75.

Electro fluidic transducer 75 has a tube 82 with a jet nozzle 76 which has a normal neutral position shown in FIG. 5b in which fluid flows through the two output conduits 79 and 81 into the cylinders 46 and 47 of the setting motor 49. An output signal from amplifier 73 entering the winding 93 causes angular displacement of the jet nozzle 76 and therefore uneven pressures in the output conduits 79 and 81 so that one of the spherical pistons 42, 43 is pressed against the projection 48 of the valve slide plate 34, turning the same together with shaft 35.

The fluidic input 82 of the transducer 75 is connected by a longitudinal bore 83, a transverse bore 84, and by a rod-shaped filter 85 with the fluid inlet 17. The arrangement of the rod-shaped filter 85, which penetrates the valve slide plate 34 in the bore 55, is particularly advantageous in view of a compact construction of the servovalve. The transverse bore 84 is closed by a ball and a plug 87, but plug 87 is threaded and can be removed for access to the ball 86.

The transverse bore 84 is connected by a channel 88 with an oil inlet 22. Due to this arrangement, the rod-shaped filter 85, which is screwed into a threaded bore of housing body 14, can be removed, and replaced by a bolt so that upon removal of the ball 86 the servo valve can be used with an oil supply independent of the inlet 17.

On the housing body 14, a plug connector 89 is provided which has a conductor corresponding to connector 98 shown in FIG. 6, through which a signal representing a desired position of the valve plate 34 can be introduced into the differential amplifier 73. The connector 89 also has contacts and connectors for the differential amplifier 73, and for the Hall generator 65.

As shown in FIGS. 5a, 5B and 6, the differential amplifier 73 is connected by input conductors 92 with the electronic position responsive generator and transmitter 65.

A first voltage signal is generated by generator 65 and transmitted as a first electric signal, representing the actual position of the valve slide plate 34, to the non-inverting input of the differential amplifier 73, and a second voltage to the inverting input so that on the output of the differential amplifier 73, the differential value of the two signals appears, and is transmitted to the winding 93 of the electro fluidic amplifier 75. A resistor 94 determines the magnitude of the current flowing through the winding 93 so that a current for limiting the amplification flows from the point 95 through resistor 96 to a summing point 97 only when in winding 93, a current corresponding to the input signal flows. This arrangement results in an inertia free control of the electro fluidic transducer 75. The input 98 which is connected with the summing point 99, serves for introducing a second signal, representing a desired position of the valve slide plate 34 into the electronic amplifier 73 where it is compared with the signal representing the actual position of the valve slide plate 34.

As shown in FIG. 5a, the consumer conduits 19, 21 are connected with two cylinder chambers formed by a piston in a double acting hydraulic consumer motor 101, and a pump discharges fluid into the inlet 17 so that fluid can be discharged from outlet 18 into a discharge container 103.

The servo control valve operates as follows:

In the illustrated neutral position of the valve slide plate 34, the electric input signal is zero, and the differential voltage of the transmitter 65 is also zero. The output signal of the differential amplifier 73 is consequently zero, so that the jet nozzle pipe 76 of the electro fluidic transducer 75 is in the middle position illustrated in FIG. 5b so that equal pressures prevail in the cylinders 46, 47 of the setting motor 49. In this middle position, the fluid inlet 17, and thereby the space 61 are closed, and the double acting consumer motor 101 is also hydraulically blocked, since the tubular members 58, 59 of the valve slide plate 34, register with the consumer ports 24, 25. Consequently, only a small flow of fluid flows from the inlet 17 through the rod-shaped filter 85 through conduits 84, 83 to the fluidic input 82 of the electro fluidic transducer 75, and flows from jet nozzle tube 76 and a return conduit in the electrofluidic transducer 75 into the container 103, as schematically shown in FIG. 5a.

If the input signal 98 is positive, the jet nozzle pipe 76 is moved to the left, as viewed in FIG. 5b, and a corresponding pressure difference forms in the setting motor 49 so that the valve slide plate 34 is turned in counterclockwise direction, whereby the valve slide plate 34 opens communication from inlet 17 through grooves 53, 54 and the consumer port 25 with one cylinder chamber of the hydraulic consumer motor 101, while the other cylinder chamber is connected through port 24 and grooves 53, 54 with the outlet 18.

The position responsive transmitter 65 responds to the angular movement of the valve slide plate 34 in counterclockwise direction, and produces a negative differential signal which becomes greater as the valve slide plate 34 moves a greater angle out of the initial neutral position. The difference between the input signal and the differential signal is amplified by electronic amplifier 73, and an amplified differential signal is transmitted from the output of the amplifier 73 to the winding 93 of the electro fluidic transducer 75. In this manner, even small positional errors of the valve slide plate are sufficient for fully utilizing the electro fluidic transducer 75, so that the required full pressure differential can be applied to the two cylinders 76, 77 of the setting motor 49. The valve slide plate 34 is always angularly displaced until the input signal at 98, representing the desired position, compensates the differential signal transmitted from the position responsive transmitter 65 to the differential amplifier 73. Depending on the magnitude of the input signal representing a desired position, any angular position of the valve slide plate 34 can be obtained.

In a corresponding manner, a negative input signal causes movement of the jet nozzle pipe 76 to the right as viewed in FIG. 5b, and the pressure differential in cylinders 46 and 47 causes an angular displacement of the valve slide plate 34 in clockwise direction. Valve slide plate 34 controls now the communication between the input 17, output 18, and the consumer conduits 19 and 21 in a reverse direction, as compared with the above-described operation. The position responsive transmitter 65 generates a positive differential signal when valve slide plate 34 is turned in clockwise direction. The differential amplifiers 73 then transmit an amplified output signal to the winding 93 of the electro fluidic transducer 75 which, by means of setting motor 49, turns the valve slide plate 34 rapidly to the position which corresponds to the desired position introduced at the input 98 of the differential amplifier 73.

The electronic differential amplifier 73 is capable of directly using signals transmitted from conventional operation amplifiers, and representing the desired position of the valve slide plate 34. The differential amplifier 73 is designed for receiving an input signal of below 1 mA as signal representing the desired position, and has an input resistance of over 10,000 Ohm.

From the above description of a preferred embodiment of the invention, it will be apparent that the embodiment comprises a housing 12 to 14 having an inlet 17 and an outlet 18 for fluid, and consumer conduit means 19, 21; a valve slide 34 mounted in the housing for movement between a plurality of positions for connecting and disconnecting the consumer conduit means 19, 21 and the inlet and outlet 17, 18; a position responsive transmitter 65 connected with valve slide 34 for movement therewith, and including generator means 67, 70, 69, 72 for generating a first electric signal at 92, representing the actual position of the valve slide 34; and differential amplifier 73 having a first input 97 receiving the first signal, and a second input 98, 99 for receiving a second electric signal representing a desired position of the valve slide 34, and an output for an amplified differential signal representing the difference between the desired position and the actual position of the valve slide 34; an electro fluidic transducer 75, 93, 76, 79, 81 having an electric input connected with the output of the differential amplifier 73 for receiving the differential signal, and a fluidic output 79, 81 for discharging fluid under the control of the differential signal; and a hydraulic setting motor 49 connected with the fluidic output 79, 81 and controlled by fluid therefrom to move the valve slide 34 from the actual position to the desired position.

An important feature of the invention is the use of a valve slide plate 34 located and movable, preferably turnable, in a plane transverse to the inlet and outlet.

While the described preferred embodiment has a valve slide plate 34 turnable about an axis, a valve slide plate which is displaceable in a translatory movement, can also be used in the servo control valve of the invention.

It will be understood that each of the elements described above, or two or more together, may also find a useful application in other parts of servo valves differing from the types described above.

While the invention has been illustrated and described as embodied in an electro hydraulic servo control valve including a differential amplifier for amplifying the signal supplied to the electric part of an electro fluidic transducer controlling a hydraulic setting motor for the valve slide, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Electrohydraulic servo control valve, comprising housing means having an inlet and an outlet for a fluid, and consumer conduit means parallel to said inlet and outlet; valve slide means including a valve slide plate mounted in said housing means for angular movement about an axis parallel to said inlet, outlet, and to said consumer conduit means and in a plane transverse to said inlet, outlet, and consumer conduit means between a plurality of positions for connecting and disconnecting said consumer conduit means and said inlet and outlet; position responsive transmitter means connected with said valve slide plate for movement therewith, and including generator means for generating a first electric signal representing the actual position of said valve slide plate; differential amplifier means having a first input receiving said first electric signal, and a second input for receiving a second electric signal representing a desired position of said valve slide plate, and an output for an amplified electric differential signal representing the difference between said desired position and said actual position; electro fluidic transducer means having an electric input connected with said output so as to receive said electric differential signal, and a fluidic output for discharging fluid under the control of said electric differential signal; and hydraulic setting means connected with said fluidic output and controlled by fluid therefrom to move said valve slide plate from said actual position to said desired position.

2. Servo control valve as claimed in claim 1 wherein said position responsive transmitter means includes a permanent magnet element, wherein said generator means include at least one flux responsive element, one of said elements being connected with said valve slide means for movement, and the other element being stationarily mounted on said housing means so that said flux responsive element is activated by said magnet.

3. Servo control valve as claimed in claim 2 wherein said generator means is a Hall generator.

4. Servo control valve as claimed in claim 2 wherein four flux responsive elements are connected to form a bridge circuit whereby said first signals of said generator means are independent from the play of said valve slide means.

5. Servo control valve as claimed in claim 1 wherein said position responsive transmitter means is connected with said valve slide plate for angular movement about said axis.

6. Servo control valve as claimed in claim 1 wherein said valve slide means includes a shaft secured to said valve plate and mounted in said housing means for angular movement with said valve plate between said positions; wherein said position responsive transmitter means includes a permanent magnet and an armature secured to said shaft for turning movement with said valve plate; and wherein said generator means include stationary flux responsive elements fixedly supported in said housing means, and electric conductors supported on said housing means and connected with said flux responsive elements.

7. Servo control valve as claimed in claim 1 wherein said valve slide means includes angularly spaced tubular members penetrating said valve slide plate parallel to said axis; wherein said housing means includes surfaces on opposite sides of said valve slide plate, one of said surfaces having ports for said inlet and outlet, and for said consumer conduit means, and the other surface having pressure chambers located opposite said ports so that said tubular members connect said ports with said pressure chambers when registering with said ports in predetermined angular positions of said valve slide plate.

8. Servo control valve as claimed in claim 7 wherein said valve slide plate has opposite end faces having projecting ridges forming areas of equal pressure communicating with each other and including a space communicating with said inlet.

9. Servo control valve as claimed in claim 1 wherein, said valve slide plate has a radial projection; and wherein said hydraulic setting motor includes two cylinders located on opposite sides of said projection, and two pistons in said cylinders engaging said projection on opposite sides, respectively, when pressure fluid is supplied by said fluidic output of said fluidic transducer means to said cylinders; wherein said fluidic output includes two output conduits connected with said cylinders, respectively; and wherein said fluidic transducer means includes means controlled by said differential signal to produce different pressures in said output conduits and cylinders so that said valve slide plate is turned.

10. Servo control valve as claimed in claim 9 wherein said pistons are spherical balls.

11. Servo control valve as claimed in claim 1 wherein said housing means includes three bodies having abutting faces, the first body being an end wall located at one end of said housing means, and formed with said inlet, said outlet, and with two consumer conduits constituting said consumer conduit means; the second body being an end member at the other end of said housing means having a cavity in which said position responsive transmitter means is located, and having an end face on which said differential amplifier means and said electro fluidic transducer means are mounted; and the third body being located intermediate said first and second bodies and having a cavity in which said valve slide plate is located.

12. Servo control valve as claimed in claim 11 wherein said housing means includes a cap attached to said end face of said second body and enclosing said differential amplifier means and said transducer means.

13. Servo control valve as claimed in claim 11 wherein said valve slide means includes a shaft carrying said valve plate in said cavity and being mounted in said first and second bodies for angular movement with said valve plate; and wherein said position responsive transmitter means includes means secured to said shaft in said second body.

14. Servo control valve as claimed in claim 1 wherein said position responsive transmitter means includes a permanent magnet and an armature connected with said valve slide plate for angular movement, said magnet and armature forming gaps permeated by magnetic flux, and wherein said generator means includes stationary flux responsive elements located in the path of said gaps and located in the same in predetermined angular positions of said valve slide plate.

15. Servo control valve as claimed in claim 1 wherein said differential amplifier is an electronic amplifier adapted to respond to electronic second signals representing a desired position of said valve slide means.

16. Servo control valve as claimed in claim 15 wherein said electronic amplifier is adapted to receive second signals not greater than 1 mA, and has an input resistance higher than 10,000 Ohm.

\* \* \* \* \*